US010704745B2

(12) United States Patent
Sherry et al.

(10) Patent No.: US 10,704,745 B2
(45) Date of Patent: Jul. 7, 2020

(54) MOBILE LIGHT SOURCE

(71) Applicant: LUME CUBE, INC., San Diego, CA (US)

(72) Inventors: Mornee Patrick Sherry, San Diego, CA (US); Matthew Milton Cummins, San Diego, CA (US)

(73) Assignee: LUME CUBE, INC., San Diego, CA (US)

( * ) Notice: Subject to any disclaimer, the term of this patent is extended or adjusted under 35 U.S.C. 154(b) by 93 days.

(21) Appl. No.: 14/882,199

(22) Filed: Oct. 13, 2015

(65) Prior Publication Data

US 2017/0102116 A1    Apr. 13, 2017

(51) Int. Cl.
*F21V 29/70* (2015.01)
*F21L 4/02* (2006.01)
(Continued)

(52) U.S. Cl.
CPC ............ *F21L 4/02* (2013.01); *F21V 23/0414* (2013.01); *F21V 29/70* (2015.01); *F21V 31/00* (2013.01); *F21V 31/005* (2013.01); *G03B 15/02* (2013.01); *F21S 9/02* (2013.01); *F21V 15/01* (2013.01); *F21V 23/0435* (2013.01);
(Continued)

(58) Field of Classification Search
CPC ........ F21V 29/507; F21V 29/89; F21V 29/70; F21V 15/01; F21V 23/0435; F21V 23/0442; F21V 23/0414; F21V 31/00; F21V 31/005; F21L 4/02; G03B 2215/0517; G03B 15/02; H05K 5/00; F21S 9/02
See application file for complete search history.

(56) References Cited

U.S. PATENT DOCUMENTS

D441,386 S    5/2001   Yamazaki
D485,003 S    1/2004   Olson et al.
(Continued)

FOREIGN PATENT DOCUMENTS

GB        2489034 A        9/2012
KR    20090001806 U        2/2009
WO   WO-2017066280 A1      4/2017

OTHER PUBLICATIONS

Francis. CES 2015: The simple Aussie invention that will improve the way you shoot pictures and videos. The Age. Available at http://www.theage.com.au/digital-life/digital-life-news/ces-2015-the-simple-aussie-invention-that-will-improve-the-way-you-shoot-pictures-and-videos-20150108-12katz.html. (6 pgs.) (Jan. 8, 2015) (Retrieved Dec. 8, 2016).

(Continued)

*Primary Examiner* — Arman B Fallahkhair
(74) *Attorney, Agent, or Firm* — Wilson Sonsini Goodrich & Rosati

(57) ABSTRACT

An apparatus for a mobile light source is described. The apparatus comprising: a first outer casing housing an array of lights, wherein the array of lights are located on a surface of a substrate, a second outer casing coupled with the first outer casing to create an enclosure that is substantially water tight, a heat shield composed of a metal alloy creating two compartments in the enclosure such that the array of lights is situated in a first compartment, and a printed circuit board (PCB) with circuitry for controlling the array of lights, the PCB situated in the second compartment of the enclosure housed by the second outer casing, and wherein a surface the PCB is substantially parallel to the surface of the substrate.

30 Claims, 7 Drawing Sheets

(51) Int. Cl.
*F21V 31/00* (2006.01)
*F21V 23/04* (2006.01)
*G03B 15/02* (2006.01)
*F21V 29/507* (2015.01)
*F21Y 115/10* (2016.01)
*F21S 9/02* (2006.01)
*F21Y 105/10* (2016.01)
*F21V 15/01* (2006.01)
*F21V 29/89* (2015.01)

(52) U.S. Cl.
CPC ......... *F21V 23/0442* (2013.01); *F21V 29/507* (2015.01); *F21V 29/89* (2015.01); *F21Y 2105/10* (2016.08); *F21Y 2115/10* (2016.08); *G03B 2215/0517* (2013.01)

(56) References Cited

U.S. PATENT DOCUMENTS

| | | | |
|---|---|---|---|
| D488,140 S | 4/2004 | Hanselman et al. | |
| D514,556 S | 2/2006 | Rising et al. | |
| D561,168 S | 2/2008 | Song et al. | |
| D567,625 S | 4/2008 | Mattson et al. | |
| D595,003 S | 6/2009 | Moehrke | |
| D598,906 S | 8/2009 | Chiba et al. | |
| 7,841,752 B2 * | 11/2010 | Lee | F21K 9/23 362/249.02 |
| 7,866,850 B2 * | 1/2011 | Alexander | F21V 19/001 362/147 |
| D633,239 S | 2/2011 | Chen et al. | |
| D639,494 S | 6/2011 | Schrimmer et al. | |
| 8,042,969 B2 * | 10/2011 | Paik | F21V 5/007 362/241 |
| D648,298 S | 11/2011 | Pierce et al. | |
| D648,471 S | 11/2011 | Wauters | |
| D649,148 S | 11/2011 | Gengoux et al. | |
| D664,704 S | 7/2012 | Boyer et al. | |
| 8,277,077 B2 * | 10/2012 | Georgitsis | B60Q 1/0483 362/217.12 |
| D670,646 S | 11/2012 | Canova et al. | |
| D670,843 S | 11/2012 | Von | |
| D676,596 S | 2/2013 | Boyer et al. | |
| D684,718 S | 6/2013 | Ko et al. | |
| D685,941 S | 7/2013 | Boyer et al. | |
| D692,939 S | 11/2013 | Huang et al. | |
| D698,980 S | 2/2014 | Yu | |
| D699,378 S | 2/2014 | Diluciano | |
| D702,393 S | 4/2014 | Ansierowicz et al. | |
| D702,394 S | 4/2014 | Shih et al. | |
| D702,863 S | 4/2014 | Kotsis | |
| D711,463 S | 8/2014 | Costabeber et al. | |
| D723,729 S | 3/2015 | Maxik et al. | |
| D727,192 S | 4/2015 | Kitchens | |
| D727,387 S | 4/2015 | Hasegawa et al. | |
| D728,836 S | 5/2015 | Metlen et al. | |
| D730,423 S | 5/2015 | Vandenbussche | |
| D745,589 S | 12/2015 | Lee et al. | |
| D745,988 S | 12/2015 | Ahn | |
| D750,687 S | 3/2016 | Samuels et al. | |
| D754,109 S | 4/2016 | Kelly et al. | |
| D754,230 S | 4/2016 | Mori et al. | |
| 9,312,706 B2 * | 4/2016 | Workman | H02J 7/0042 |
| D760,312 S | 6/2016 | Lee et al. | |
| D762,759 S | 8/2016 | Wu et al. | |
| 9,447,955 B2 * | 9/2016 | Miller | F21L 4/027 |
| D772,221 S | 11/2016 | Kacin et al. | |
| D773,547 S | 12/2016 | Lee et al. | |
| D773,706 S | 12/2016 | Ookawa et al. | |
| D775,752 S | 1/2017 | Nook et al. | |
| D778,474 S | 2/2017 | Scazziga | |
| D779,242 S | 2/2017 | Kacin et al. | |
| D781,250 S | 3/2017 | Cartwright et al. | |
| D783,195 S | 4/2017 | Gan | |
| D785,068 S | 4/2017 | Patsis et al. | |
| D785,365 S | 5/2017 | Newlin et al. | |
| D788,835 S | 6/2017 | Wu et al. | |
| 9,746,170 B1 * | 8/2017 | Armer | F21V 29/58 |
| D800,077 S | 10/2017 | Windstrup et al. | |
| D808,564 S | 1/2018 | Zheng et al. | |
| D820,488 S | 6/2018 | Kinsen et al. | |
| D824,368 S | 7/2018 | Kacin et al. | |
| 2007/0159815 A1 | 7/2007 | Bayat et al. | |
| 2008/0205049 A1 | 8/2008 | Brain | |
| 2009/0310342 A1 * | 12/2009 | Chang | F21L 4/027 362/205 |
| 2011/0195753 A1 * | 8/2011 | Mock | H04B 1/3888 455/566 |
| 2012/0274208 A1 | 11/2012 | Chen et al. | |
| 2013/0039043 A1 | 2/2013 | Doyle | |
| 2013/0229515 A1 | 9/2013 | Barley et al. | |
| 2013/0265755 A1 * | 10/2013 | Adams | F21V 5/04 362/235 |
| 2014/0235691 A1 | 8/2014 | Demopulos et al. | |
| 2015/0003050 A1 * | 1/2015 | Parsons | F21L 4/005 362/158 |

OTHER PUBLICATIONS

Mansurov. The Lume Cube and Why You Want It. Photography Life. Available at https://photographylife.comilume-cube-and-why-you-want-it (6 pgs) (Posted Jun. 12, 2015) (Retrieved from the Internet Dec. 8, 2016).
PCT/US2016/056582 International Search Report and Written Opinion dated Jan. 19, 2017.
Co-pending U.S. Appl. No. 29/539,848, filed Sep. 17, 2015.
Co-pending U.S. Appl. No. 29/580,497, filed Oct. 10, 2016.
Co-pending U.S. Appl. No. 29/637,047, filed Feb. 15, 2018.
Co-pending U.S. Appl. No. 29/637,049, filed Feb. 15, 2018.
U.S. Appl. No. 29/637,047 Office Action dated Jul. 2, 2018.
U.S. Appl. No. 29/637,049 Office Action dated Jul. 2, 2018.
U.S. Appl. No. 29/580,497 Office Action dated Oct. 5, 2018.

* cited by examiner

MOBILE LIGHT SOURCE

BACKGROUND

Many devices and technology requires a light source for optimal operating conditions. For example, cameras require light to properly capture images. Cell phones, smart phones, and other mobile devices have cameras. Many cameras or video cameras may have no light source or an inadequate light source. A light source may not be readily available at a given location such as outdoors. Other light sources may be hardwired to an electrical outlet or may be large, bulky, and heavy. Light sources may be required for uses other than cameras or photography.

Figure 1:
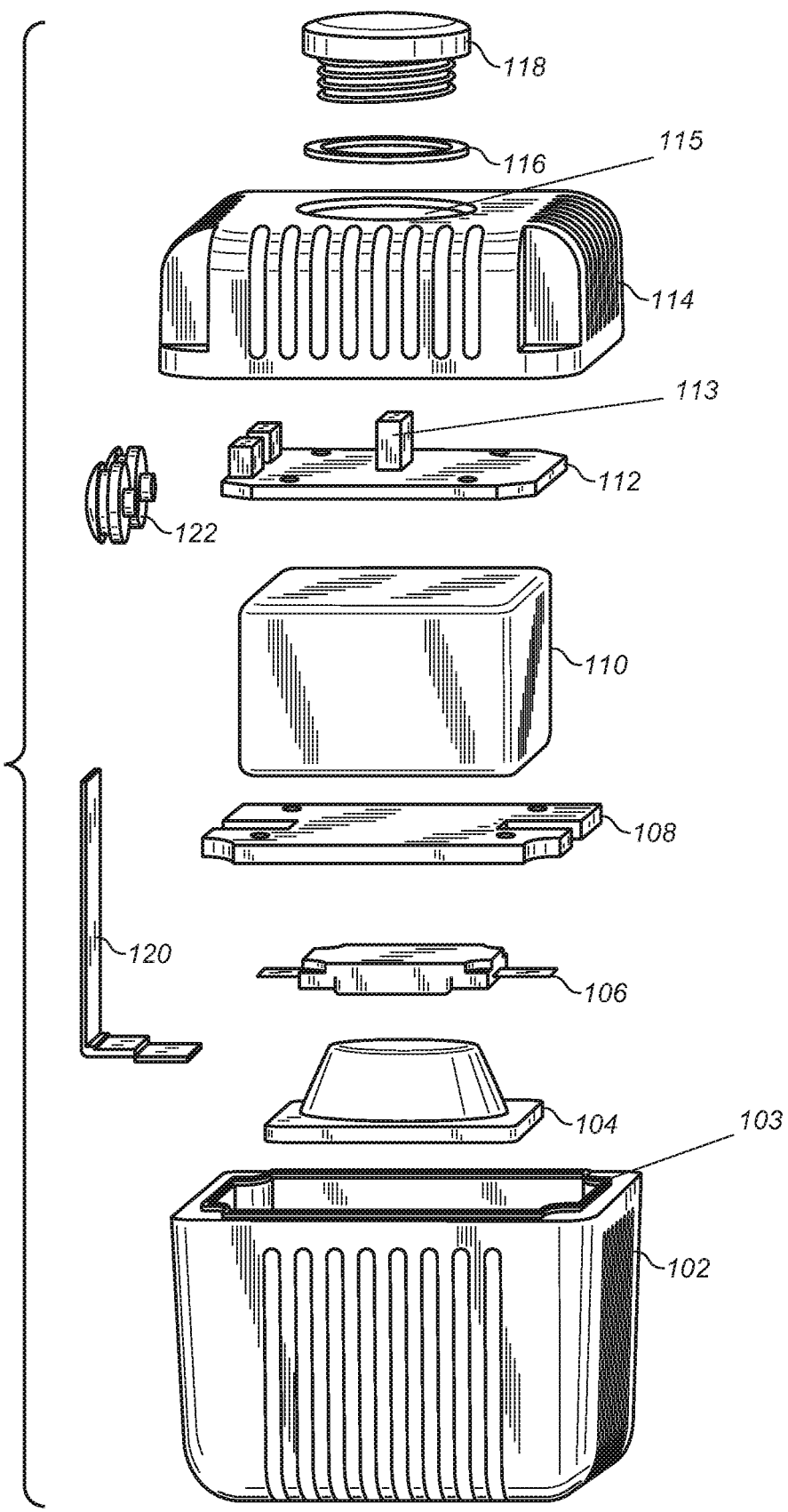
FIG. 1 is a block diagram of an exploded view of a mobile light source in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Overview for a Mobile Light Source

Embodiments of the present technology are for a mobile light source which may also be described as a high powered compact light for cameras and mobile devices. The mobile light source may also be described as the Lume Cube. As used herein, the phrase "mobile light source" describes a small, compact, lightweight device that is mobile and emits a bright light with the features and details provided below. In one embodiment, the mobile light source is substantially waterproof, water resistant, or water tight. The mobile light source may be used in conjunction with an external device such as a Go Pro™ style video camera, smart phone, camera, video camera, or other device or the mobile light source may be used as a standalone light source. The external devices may be an iPhone, an Android device, other types of smart phones, an iPad, a tablet computer, a laptop computer, webcam, etc. The light emitted by the mobile light source may be controlled such that the light may be constant, may be a single flash, or may be a strobe light and may have the intensity of the light adjusted. The light device may be mounted to a bracket, the external device, another mobile light source, some other structure, or may be set on a surface such as a shelf, or may be handheld. The mobile light source may be used in conjunction with a plurality of other mobile light sources. Because the mobile light source is mobile, bright, and substantially waterproof, it is ideal as light source to be used while capturing images or video especially outdoors, in the dark, and in or around water.

In one embodiment, the mobile light source is to be used in conjunction with other mobile device or for activities that require a mobile light source. The mobile light source is compact, lightweight, and designed to be used on the go while reducing the need to constantly recharge between uses. In one embodiment, the mobile light source may be used as a slave to another light source or flash. For example, a simple camera may comprise a flash that is inadequate for some uses. In one embodiment, the mobile light source comprises an optical infrared sensor that detects when the flash of a camera has been activated or has emitted light. The mobile light source is then triggered to also emit a flash of light to supplement the light emitted by the flash of the camera thus providing more light for the photograph that is to be captured. Such techniques may be used without the camera, the flash, and the mobile light being in communication or control of one another. In one embodiment, the mobile light source has buttons used to turn the array of lights on for constant light or a strobe light. In one embodiment, the mobile light source is in communication with and is controlled by the external device. This may be accomplished using Bluetooth, WiFi, or other wireless communication protocols.

In one embodiment, the mobile light source comprises an array of light emitting diodes (LEDs) that have been selected to balance a high light output with a low amount of heat output. LED may also be selected for low power consumption. Embodiments of the present technology employee features and techniques to handle the heat dissipated by powerful lights in a small device. For example, a heat shield is placed in the mobile light source between the array of lights and a printed circuit board (PCB) to prevent the heat emitted by the array of lights from warping or otherwise damaging the PCB. In one embodiment, the battery or batteries are placed between the PCB and the heat shield. The array of lights may be situated on a surface of a substrate. The heat shield may be planar in nature such that it is larger in width and length compared to depth. The width and length define a surface of the heat shield. In one embodiment, a surface of the substrate used to mount the lights is substantially parallel to the surface of the heat shield which is also substantially parallel to the surface of the PCB. The arraignment of these three surfaces being substantially parallel provides for protecting the PCB from the heat of the array of lights.

In one embodiment, the mobile light source has a first outer casing housing the array of lights that is composed of a metal alloy such as an aluminum alloy. The metal alloy dissipates heat to the environment surrounding the mobile light source. The first outer casing may comprise grooves to assist with heat dissipation include channeling air flow through the grooves. In one embodiment, the heat shield is in contact with the first outer casing to allow heat to transfer from the heat shield to the first outer casing.

Embodiments for a Mobile Light Source

With reference to FIG. 1 which depicts an exploded view of a mobile light source in accordance with embodiments of the present technology. In one embodiment, first outer casing 102 is composed of a metal alloy such as an aluminum alloy. First outer casing 102 houses lens 104 and array of lights 106. The heat from array of lights 106 emitting light is dissipated to the environment surrounding the mobile light source by transferring the heat through the metal allow of first outer casing 102. In one embodiment, first outer casing 102 comprises grooves as depicted in FIG. 1 that increase the surface area of first outer casing 102 and allow for more heat to be dissipated or radiated off the surface of first outer casing 102. The grooves also channel air moving over the surface of first outer casing 102 for better heat dissipation. Array of lights 106 comprises an array of lights such as LED's. The array of lights are situated on, placed on, or mounted to the surface of a substrate. The surface of the substrate defines a plane in two dimensional space. In one embodiment, array of lights 106 has nine LEDs but may comprise a different number of LED's such as one, three, or more LEDs. In one embodiment, the output of array of lights 106 is 1500 lumens. The LEDs employed may be selected for outdoor use and for longevity as well as low heat output.

In one embodiment, lens 104 is a custom built lens that is seven mm thick and is designed to focus or direct the light from array of lights 106. In one embodiment, lens 104 is constructed to direct light in funnel shape at a 57 degree angle to direct light. It should be appreciated that that other thicknesses of lenses may be employed and may focus the light in different angles. In one embodiment, lens 104 is a lens that has the ability to focus and can be adjusted by turning a ring on the outside of the lens which is also on the outside of first outer casing 102. In one embodiment, attachments may be made to the outside of the mobile light source to enhance or otherwise alter lens 104. For example, another lens may be attached or clipped over lens 104. A diffuser or color gels may also be placed over lens 104.

In one embodiment, mobile light source comprises shield 108 which is a heat shield or heat barrier located on the interior of mobile light source. The outer structure of mobile light source is primarily formed by first outer casing 102 and second outer casing 114 which connect or couple and form an enclosure. The enclosure is divided into a first and second compartment by shield 108. The first compartment houses array of lights 106 and second compartment houses battery 110 and PCB 112. Shield 108 is composed of a metal alloy such as an aluminum alloy or other alloy and is in contact with first outer casing 102. The metal alloy of shield 108 allows heat from array of lights 106 to be dissipated or transferred to first outer casing 102. Shield 108 creates a heat barrier shielding battery 110 and PCB 112 from the heat generated by array of lights 106. Shield 108 may not shield PCB 112 from all heat, but is sufficient to prevent warping or other damage to PCB 112. Shield 108 also comprises openings, slots, or ports to allow wired connections to pass through shield 108. For example, a wire depicted by 120 connecting PCB 112 to array of lights 106 may pass through shield 108. 120 also depicts a PCB smaller than PCB 112 that is employed to control array of lights 106 and may or may not be connected with an optical infrared sensor. In one embodiment, shield 108 is 1.6 mm thick and is composed of 6001 aluminum.

In one embodiment, battery 110 is housed in the second compartment and may be partially housed by first outer casing 102 and partially housed by second outer casing 114. In one embodiment, the second compartment is entirely housed by second outer casing 114. It should be appreciated that battery 110 may be custom built to a shape specifically designed to the space available in mobile light source. In one embodiment, battery 110 represents two batteries that are both used to power array of lights 106 and the other components of mobile light source such as an antenna on PCB 112. In one embodiment, battery 110 is two batteries each of which is an 800 mAh battery. In one embodiment, battery 110 is placed between shield 108 and PCB 112 as depicted to put more space between PCB 112 and array of lights 106. However, alternate configuration may be employed. In one embodiment, battery 110 is a rechargeable battery and is recharged by a user connecting a wire to PCB 112. For example, PCB 112 may have a universal serial bus (USB) port 113 protruding from PCB 112 as depicted in the middle of PCB 112 in FIG. 1. The USB port may be a standard size, a micro size, or a mini size. Alternatively, other ports such as a proprietary port may be used. The wire connected to the USB port 113 provides electrical power to PCB 112 to recharge battery 110 via USB port 113. In one embodiment, battery 110 is directly in contact with shield 108 on one side and PCB 112 on the other side. In one embodiment, battery 110 does not produce enough heat to negatively affect or damage PCB 112.

PCB 112 is a printed circuit board comprising circuits and electrical components used for the control and operation of mobile light source. In one embodiment, PCB 112 comprises an antenna or other wireless receiver which uses a wireless protocol for communications such as Bluetooth, WiFi, or other protocols. This allows an external device to send command signals to the mobile light source. In one embodiment, PCB 112 comprises a substrate that is thicker than what is standard for a PCB typically associated with a light source to prevent warping due to the heat from array of lights 106. In one embodiment, PCB 112 may use two layers of substrate to provide a heat resistant thickness. As depicted, the top of PCB 112 comprises two protrusions to connect to physical buttons such as buttons 122. It should be appreciated that that PCB 112 and mobile light source may comprise any number of buttons such as one, two or three buttons. The physical button may be comprised of or covered in silicone such that they may be depressed by a user while maintaining water proof or water tight properties. Buttons 122 may extend or protrude through openings in second outer casing 114. Buttons 122 are employed by a user to control the light emitted by mobile light source. For example, a button press may activate feature or turn a feature on or off.

In one embodiment, PCB 112 comprises at least one surface that is larger in two dimensions than a third dimension. In other words, PCB 112 may have a length and width that are many times longer than a thickness or depth. This surface defined in two dimensions substantially forms a plane. Substantially meaning that the surface is flat but may not be perfectly flat and may have waves or angles on the surface that are small relative to the overall size of the surface or plane. In other words, substantially forms a plane means that the surface is forms a plane more so than it does not form a plane. Similarly, as described above, a surface of the substrate for array of lights 106 and a surface shield 108 each substantially form a plane. In one embodiment, these three surfaces of the substrate for array of lights 106, the surface of shield 108 and the surface of PCB 112 are placed substantially parallel to one another. This parallel placement allows the heat generated by array of lights 106 to be properly dissipated by shield 108 thus protecting battery 110 and PCB 112. Substantially parallel, as used herein, refers to two surfaces or planes being parallel to one another but also that the surfaces may be slightly not parallel by a degree of magnitude that is small relative to the overall size of the surface.

A single brief button press may control one feature while a button press of different duration for the same button may control a different feature. Thus the same button may be used to control a plurality of features. Features controlled by button presses may include, but are not limited to on and off of a constant emission of light, on and off of a strobe light, on and off of a single flash of light, brightness control, pairing the mobile light source with an external device, turn on and off an optical infrared sensor, and turn on and off slave control. A user may adjust a brightness of a constant light emission in ten percent intervals. In other words, when array of lights 106 is emitting at one hundred percent brightness, each subsequent button press would reduce the brightness by ten percent.

Buttons 122 may comprise multi colored lights such as LEDs that can turn on and off or flash different colors, such as red and green, and act as indicators to a user. For example, a red flash of an LED may indicate that a device is not connected to an external device while a green flash of light indicates that device is paired to an external device. In one embodiment, PCB 112 comprises embedded software for controlling array of lights 106 as well as taking action in response to button pushes and commands received from an external device.

In one embodiment, mobile light source comprises second outer casing 114 which is coupled with, connected to, or otherwise attached to first outer casing 102. Second outer casing 114 may comprised of a hard shell plastic or other material such as metal. First outer casing 102 and second outer casing 114 form the outer structure of the mobile light source and provide a substantially water tight or waterproof housing for the components on the interior of the mobile light source. Substantially water tight or waterproof, as used herein, refers to seal or connection that does not allow water to pass but may allow small amount of water to pass. In one embodiment, the mobile light source is water proof up to depths of 100 feet meaning that no water or very little water will penetrate into the interior of mobile light source. Thus the mobile light source may be used as a light source for video activities in, on, near, or underwater. In one embodiment, first outer casing 102 and second outer casing 114 have a gasket 103 or o-ring composed of rubber or other material place between them to ensure a waterproof connection.

In one embodiment, second outer casing 114 comprises and opening 115 to provide access to PCB. The opening may be substantially circular and threaded such that cap 118, which may also be threaded, can be screwed into the opening. Gasket 116 may be a gasket or o-ring composed of rubber or other materials and may be placed in between the opening of second outer casing 114 to provide a water tight or water proof seal. In one embodiment, cap 118 is composed of zinc alloy material. In one embodiment, cap 118 may be removed from second outer casing 114 and the opening may then be used to mount the mobile light source to another structure such as a bracket designed to couple the mobile light source with an external device such as a video camera or a bracket that couples a plurality of mobile light sources. Alternatively, cap 118 may be replaced by mounting devices such as a cap with suction features that allows the mobile light source to be mounted to a smooth surface such as glass via a suction cup. A magnetic cap may also replace cap 118 to magnetically mount mobile light source to a metallic structure.

In one embodiment, second outer casing 114 is formed with grooves, screw holes, or other shapes to allow coupling or mounting of mobile light source to other structures, devices, attachments or accessories. For example, accessories such as lenses, may clip over second outer casing 114 using clips designed to mate with shapes in the structure of second outer casing 114. In one embodiment, first outer casing 102 comprises a standard quarter inch size 20 mount for mounting the mobile light source to a standard tri-pod or other apparatus. It should be appreciated that first outer casing 102 may also comprise similar grooves, screw holes, or other shapes for attachments.

In one embodiment, the overall shape of a mobile light source is substantially a cube with rounded corners and grooves on the surface where no side of the cube is longer than two inches. In one embodiment, no side of the mobile light source measures longer than 43 mm. In one embodiment, first outer casing 102 has the outer dimensions of 43 mm×43 mm×25.8 mm. In one embodiment, the dimensions for lens 104 are 20.28 mm×20.28 mm. In one embodiment, second outer casing 114 has the outer dimensions of 43 mm×43 mm×17.2 mm.

Figure 2:
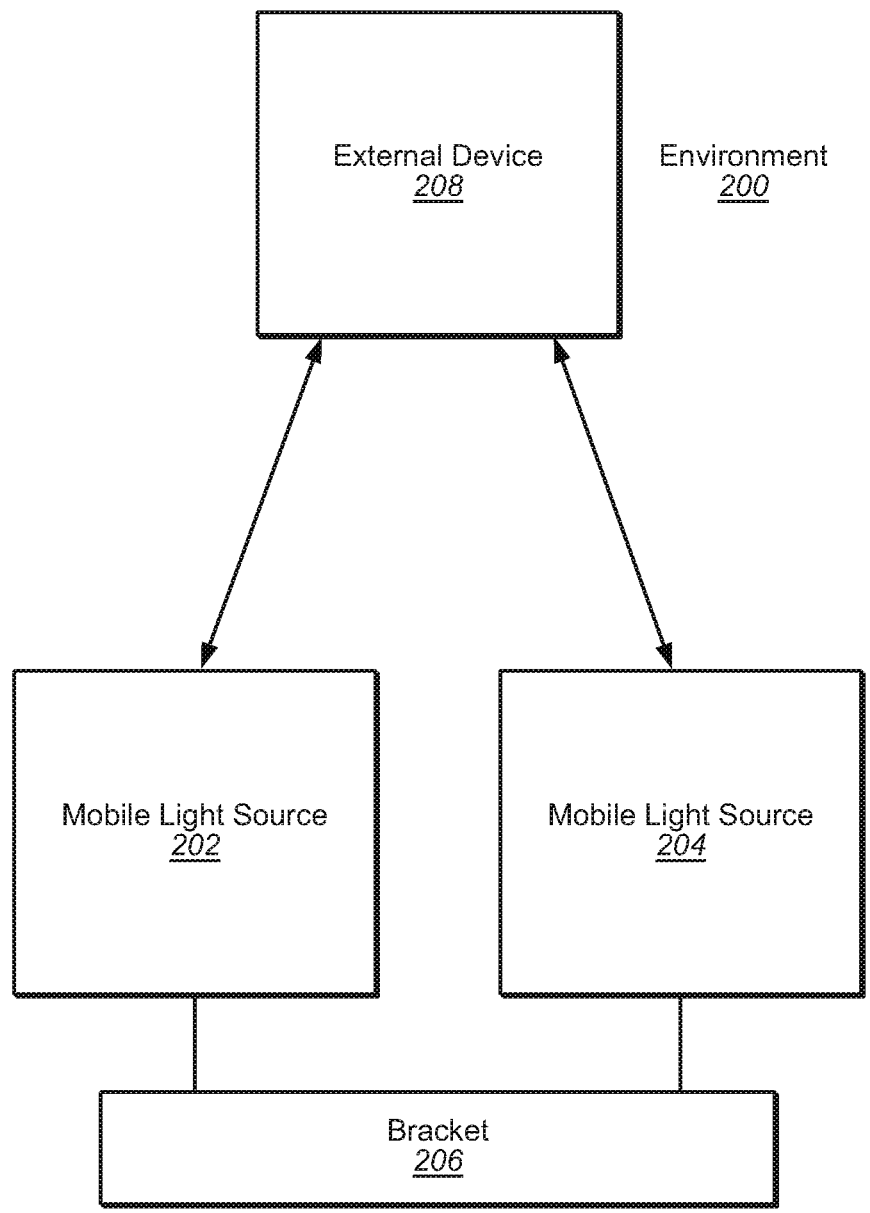
FIG. 2 is a block diagram of an environment for mobile light sources in accordance with embodiments of the present technology.

With reference to FIG. 2 which depicts environment 200 with mobile light sources in accordance with embodiments of the present technology. FIG. 2 depicts two mobile light sources including mobile light source 202 and mobile light source 204 both mounted to bracket 206. It should be appreciated that environment 200 may comprise any number of mobile light sources and brackets and is not limited to configuration depicted. For example, a bracket may hold more or less than two mobile light sources. External device 208 is an external device that is capable of controlling a mobile light source. External device 208 may be a smart phone, a tablet computer, a laptop, a video camera, etc. External device 208 employs an app or a software application and wireless protocols to communication with and control a mobile light source. FIG. 2 depicts external device 208 in communication with and in control of mobile light source 202 and mobile light source 204. An external device may be associated with one, two, or virtually any number of mobile light source. The multiple mobile light sources do not need to be mounted to the same bracket as is depicted in FIG. 2. The app executing on external device 208 may be employed to control various features or capabilities of the mobile light source including a brightness of the light, a duration of light, turning on/off a strobe light effect, controlling a red eye flash carried out before a picture is capture, or a sensor to reduce red eye in photos, turns on/off an optical infrared (IR) sensor. The app can also receive and display information to a user about the mobile light source such as review battery level, signal strength, Bluetooth strength, current brightness level, etc.

In one embodiment, external device 208 is not connected to or in communication with either mobile light source 202 or mobile light source 204. In such an embodiment, mobile light source 202 and mobile light source 204 can be slaves to a built in flash that is associated with external device 208. External device 208 may be a camera with a flash and when the flash of external device 208 is emitted, an optical IR sensor associated with each mobile light source will detect the flash and trigger the mobile light source to emit its own flash to supplement the flash of external device 208. Thus the mobile light source may be a slave to the flash of external device 208. This slave flash technique may be employed using any number of mobile light sources. Additionally, mobile light source 204 may act as a slave to mobile light source 202 or vice versa. For example, mobile light source 202 may be controlled by an app associated with external device 208 while mobile light source 204 is not connected to external device 208 but is a slave to mobile light source 202.

Figure 3:
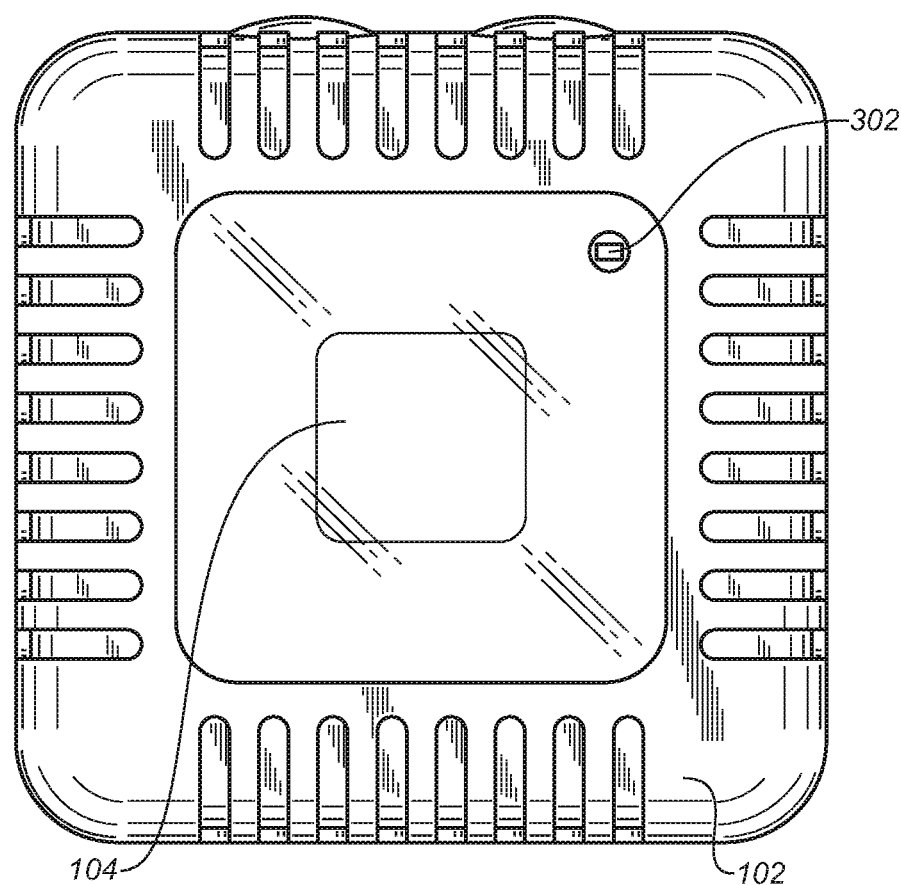
FIG. 3 is a block diagram of front view of mobile light source in accordance with embodiments of the present technology.

With reference to FIG. 3 which depicts a front view of a mobile light source in accordance with embodiments of the present technology. First outer casing 102 depicts an outer casing with the same features as first outer casing 102 of FIG. 1. Lens 104 depicts a lens with the same features as lens 104 of FIG. 1. IR sensor 302 depicts an optical infrared sensor that can detect a flash of light from an external device such as the flash from a camera. IR sensor 302 allows the mobile light source to be a flash slave as described above.

Figure 4A:
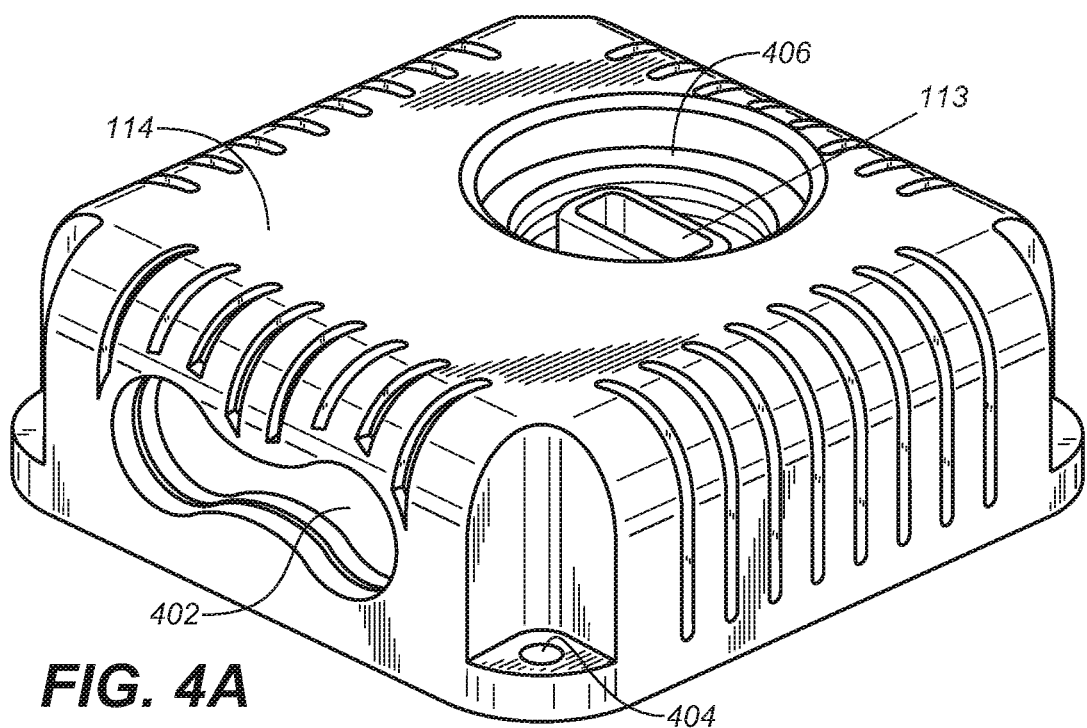
FIG. 4A is a block diagram of three dimensional view of mobile light source outer casing in accordance with embodiments of the present technology.

With reference to FIG. 4A which depicts three dimensional view of second outer casing 114 in accordance with embodiments of the present technology. Second outer casing 114 has all the features of second outer casing 114 of FIG. 1. Opening 402 depicts an opening for two buttons connected to a PCB such as buttons 122 of FIG. 1. Hole 404 depicts a hole that may be used to fasten second outer casing 114 to a first outer casing or may be used to couple an attachment to the mobile light source. In one embodiment, opening 115 of FIG. 1 may be threaded, to form a threaded opening 406, where the threads are used to attached cap 118 of FIG. 1 or to mount second outer casing 114 to a mounting bracket or other structure. Threaded opening 406 depicts an opening that allows a wire or cable with a USB connector to be connected to the PCB of the mobile light source. Threaded opening 406 is depicted as being offset from the center of the back surface of second outer casing 114. It should be appreciated that threaded opening 406 may be offset, centered, or otherwise situated on the surface of second outer casing 114. It should also be appreciated that threaded opening 406 may be any size or shape that would allow the PCB to be connected to wire for purposes of charging a battery or transferring data to and from the PCB via USB port 113.

Figure 4B:
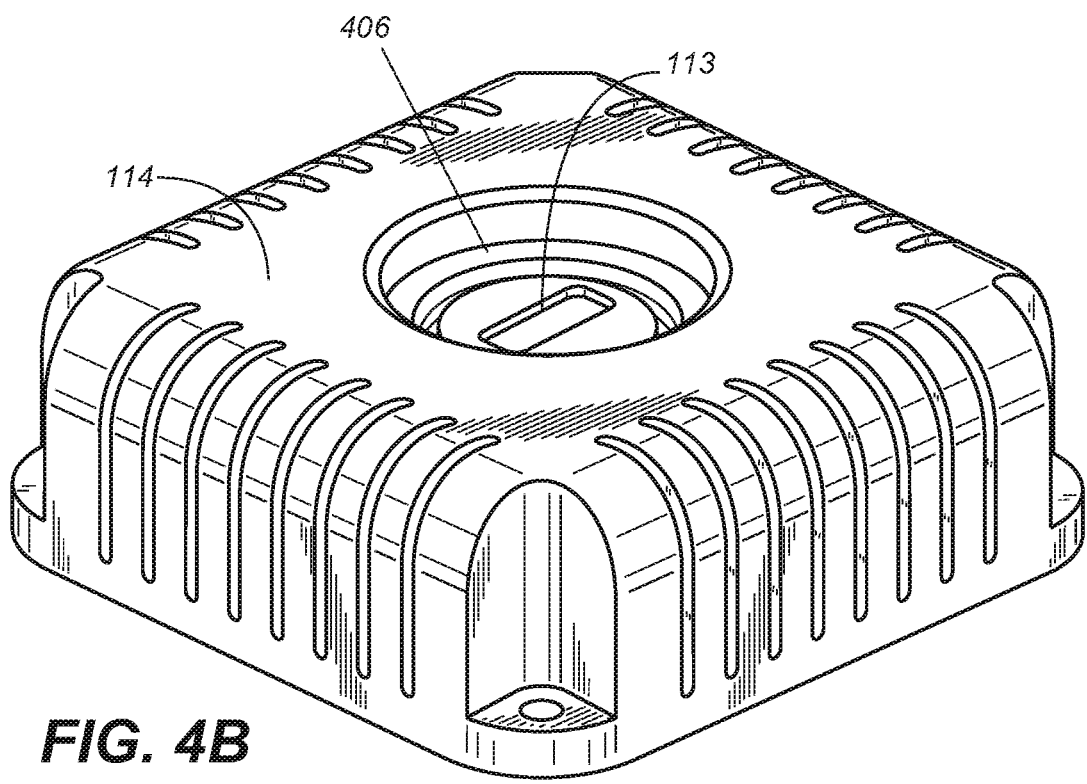
FIG. 4B is a block diagram of three dimensional view of mobile light source outer casing in accordance with embodiments of the present technology.

With reference to FIG. 4B which depicts three dimensional view of second outer casing 114 in accordance with embodiments of the present technology. Second outer casing 114 may have all the features of second outer casing 114 of FIG. 1 and of FIG. 4A. In one embodiment, opening 115 of FIG. 1 may be threaded, to form a treaded opening 406, where the threads are used to attached cap 118 of FIG. 1 or to mount second outer casing 114 to a mounting bracket or other structure. Threaded opening 406 is an opening that allows a wire to pass through second outer casing 114. The wire may be to charge or recharge the battery in the mobile light source or may be to transfer data to and from the PCB via USB port 113. Threaded opening 406 is depicted as being centered in the back surface of second outer casing 114.

Figure 5:
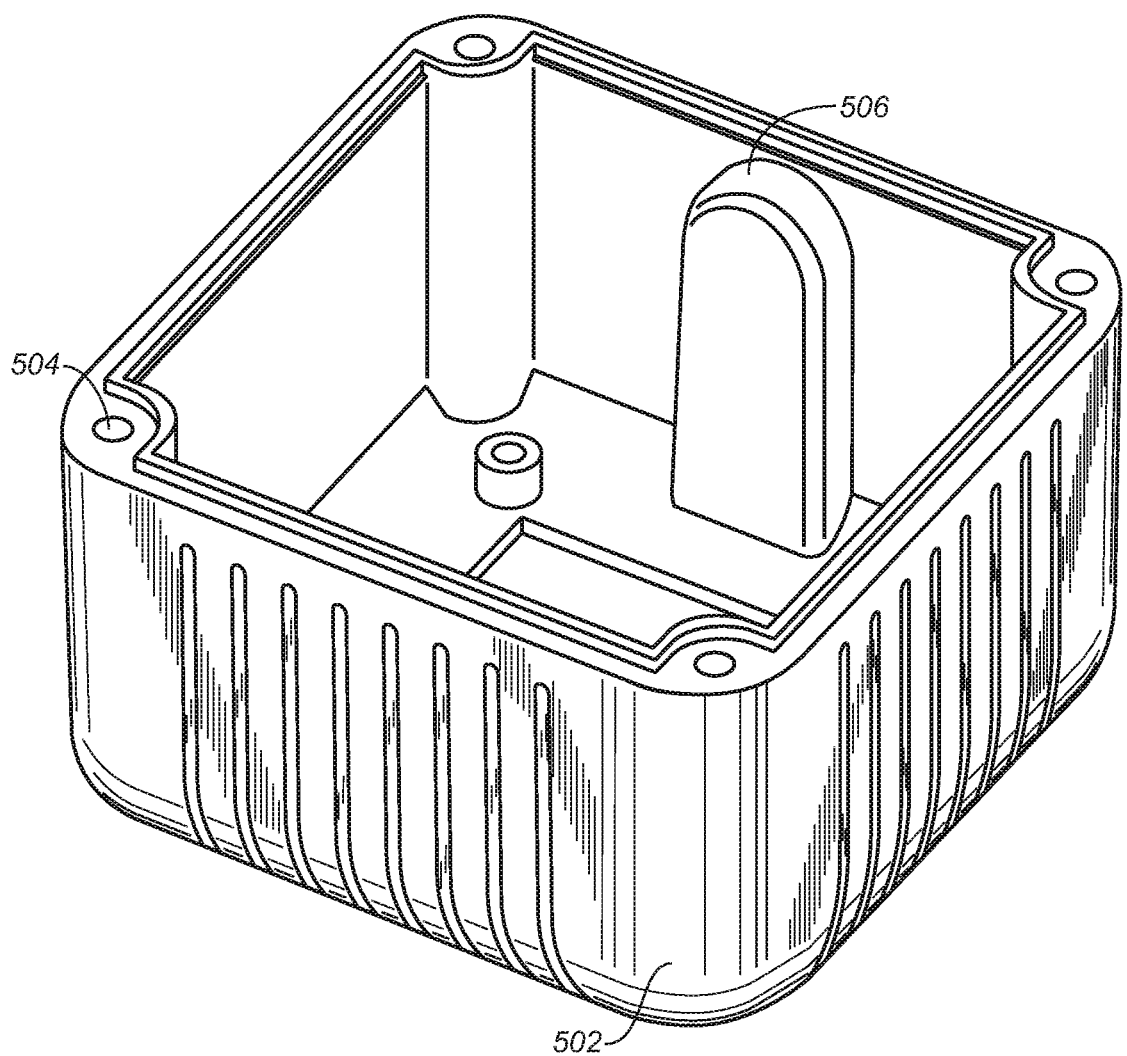
FIG. 5 is a block diagram of three dimensional view of mobile light source outer casing in accordance with embodiments of the present technology.

With reference to FIG. 5 which depicts a three dimensional view of the interior and side of an outer casing for a mobile light source of in accordance with embodiments of the present technology. In one embodiment, first outer casing 502 has all the features and capabilities of first outer casing 102 of FIG. 1. First outer casing 502 depicts the four points at which first outer casing 502 is to be coupled or attached to a second outer casing. Point 504 is one of the four connection points. Slot 506 depicts a slot that is shaped into first outer casing 502 to allow for a mounting point to be built into first outer casing 502. The four points for attached as well as slot 506 cause the interior shape of first outer casing 502 to be altered accordingly. These alterations must be matched by the heat shield as is depicted by FIG. 6.

Figure 6:
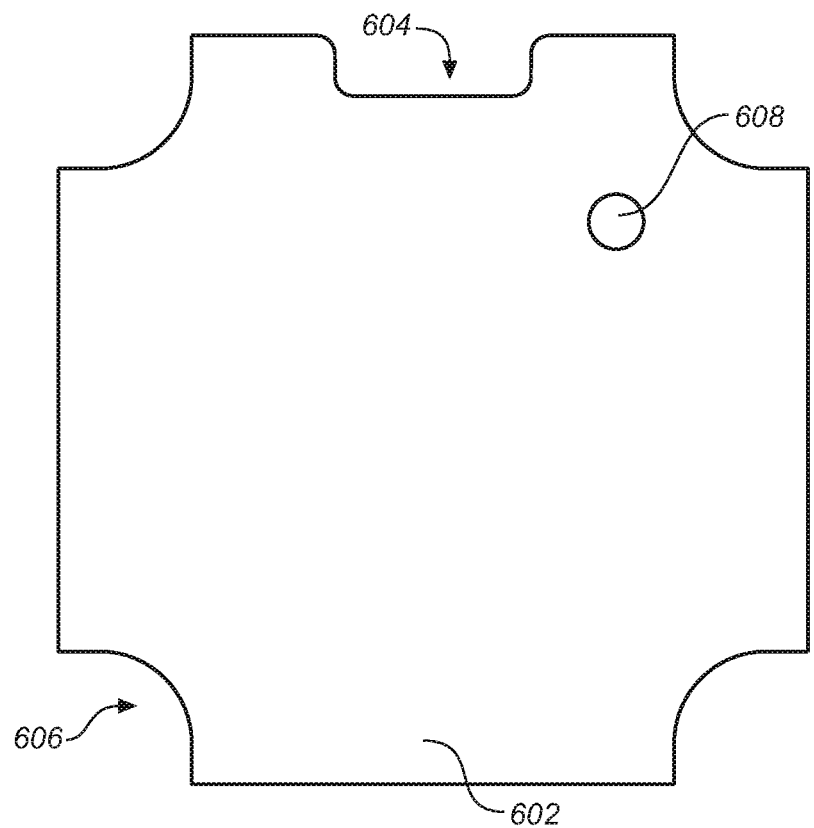
FIG. 6 is a block diagram of a heat shield for a mobile light source outer casing in accordance with embodiments of the present technology.

With reference to FIG. 6 which depicts a block diagram of a heat shield or barrier for a mobile light source of in accordance with embodiments of the present technology. Shield 602 has all the same features as shield 108 of FIG. 1. The shape of shield 602 is generally square but the square shape is altered to be tailored to the actual shape of first outer casing 102 of FIG. 1 or first outer casing 502 of FIG. 5. For example, point 504 of FIG. 5 requires the corner of shield 602 to be notched by a quarter round notch. Similar quarter round notches are found on each of the four corners of shield 602. Notch 604 is notched to match slot 506 in first outer casing 102 of FIG. 5. Such notches provide a contoured shape to shield 602 to precisely match the actual contours of the first outer casing. The purpose of this matching contour is twofold. The first purpose is to prevent air flow within enclosure of the mobile light source such that air contacting the array of lights will not circulate heat to the battery and PCB. Thus any heat transfer must pass directly through shield 602. The second purpose is to maximize contact between shield 602 and the first outer casing. This allows heat built up in shield 602 to transfer effectively to the first outer casing which is then dissipated to the air external to the mobile light source. Hole 608 depicts a hole in shield 602 to allow a wire to pass through shield 602 such as the wire depicted at 120 in FIG. 1. It should be appreciated that shield 602 may have one or more holes, openings, grooves, or slots to allow wires to pass through, and that the openings, grooves or slots can be placed along the edge of shield 602.

Figure 7:
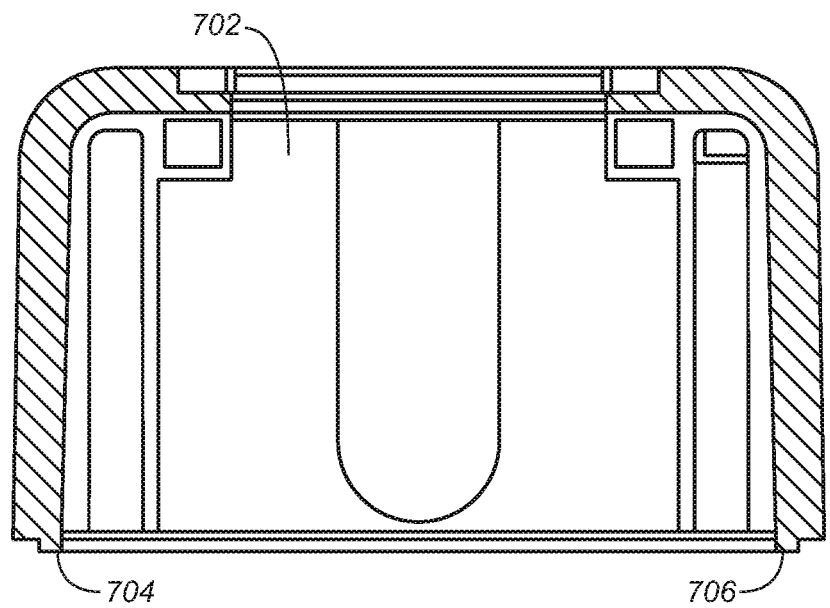
FIG. 7 is a cross section view of mobile light source outer casing in accordance with embodiments of the present technology.

With reference to FIG. 7 which a cross section view of a first outer casing for a mobile light source of in accordance with embodiments of the present technology. In one embodiment, first outer casing 702 has all the features and capabilities of first outer casing 102 of FIG. 1. The cross section view of first outer casing 702 depicts the sidewalls 704 and 706. The sidewalls 704 and 706 are depicted as not being perfectly straight but rather slightly bow away from each other. In other words, the sidewalls curve away from each other. Such bowing or curving must be correct when first outer casing 702 is coupled with a second outer casing by physically squeezing the sidewalls together. After the first outer casing is coupled with the second outer casing, the curved sidewalls provide a spring like action that creates a tighter seal where first outer casing and second outer casing contact one another or contact a gasket between the outer casings. The tighter seal functions make the seal substantially water tight or water proof.

Figure 8:
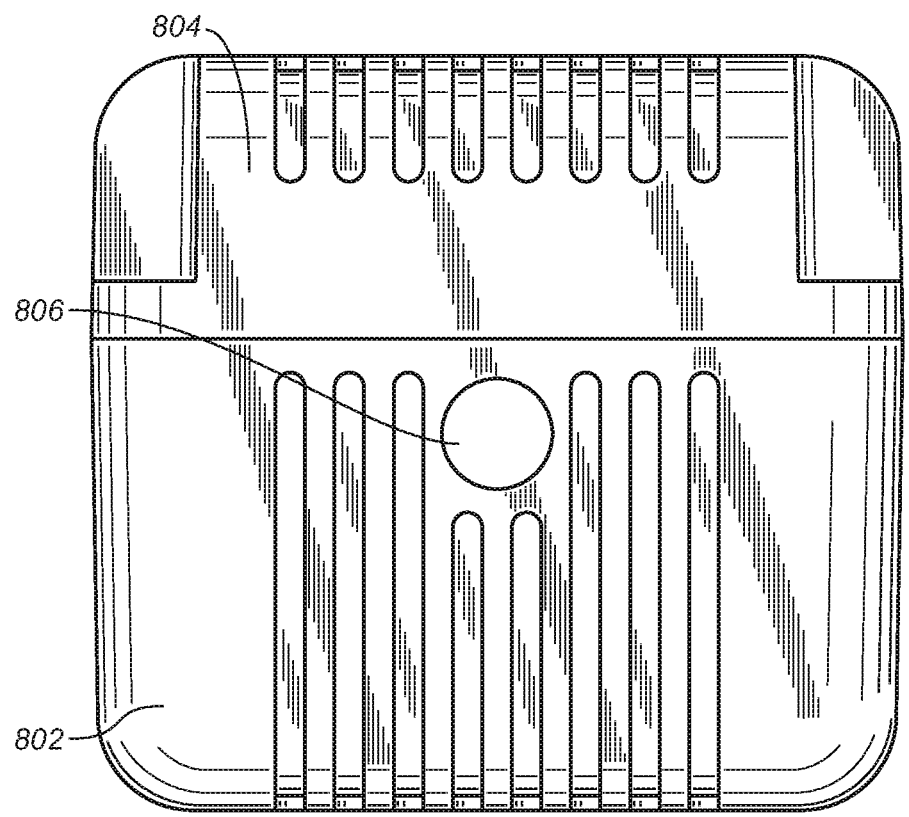
FIG. 8 is a bottom view of mobile light source in accordance with embodiments of the present technology.

With reference to FIG. 8 which depicts a bottom view if a mobile light source of in accordance with embodiments of the present technology. In one embodiment, first outer casing 802 has all the features and capabilities of first outer casing 102 of FIG. 1 and second outer casing 804 has all the features and capabilities of second outer casing 114 of FIG. 1. FIG. 8 depicts indentation 806 in first outer casing 802 which is an indentation that allows the mobile light source to be mounted to or otherwise attached to a bracket, tripod, or other structure. Conversely, indentation 806 may also be used to attach or fasten a component or attached to the mobile light source. In one embodiment, indentation 806 is threaded and is a standard quarter inch size 20 mount.

The invention claimed is:

1. An apparatus for a compact, lightweight, and bright mobile light source, comprising:
   (a) a first outer casing, wherein said first outer casing is composed of a first metal alloy and comprises grooves in at least one outer surface to dissipate heat;
   (b) a second outer casing, wherein said second outer casing is coupled with said first outer casing to create an enclosure that is substantially water tight;
   (c) a heat shield,
      wherein said heat shield is composed of a second metal alloy and has a shape contoured to match an interior shape of said first outer casing providing contact with said first outer casing;
      wherein said heat shield fits into said first outer casing to divide said enclosure into a first compartment and a second compartment and to create a thermal barrier between said first compartment and said second compartment, and
      wherein said thermal barrier reduces heat generated within said first compartment moving to said second compartment and transfers heat generated within said first compartment to said first outer casing;
   (d) an array of lights within said first compartment;
   (e) a lens situated in said first outer casing to allow light emitting from said array of lights to pass through said first outer casing;
   (f) at least one battery within said second compartment; and
   (g) a printed circuit board (PCB) within said second compartment, wherein said PCB comprises circuitry for controlling said array of lights, said PCB situated in said second compartment of said enclosure housed by said second outer casing, wherein said circuitry for controlling said array of lights is configured to provide a plurality of user-selectable modes comprising: a constant emission of light mode, with user-selectable brightness, and a strobing light mode;
   wherein said heat shield is positioned between said array of lights and said PCB, and
   wherein said at least one battery is positioned between said heat shield and said PCB.

2. The apparatus as recited in claim 1, wherein said second outer casing is composed of hard shell plastic and further comprises a threaded opening to allow access to a charging port on said PCB.

3. The apparatus as recited in claim 2, further comprising a threaded cap to screw into said threaded opening of said second outer casing to form a substantially water tight seal.

4. The apparatus as recited in claim 2, wherein said threaded cap is composed of a zinc alloy.

5. The apparatus as recited in claim 1, wherein said interior shape of said first outer casing comprises a connection feature for said first outer casing to be coupled to said second outer casing.

6. The apparatus as recited in claim 5, wherein said connection feature comprises a plurality of points and one or more mounting points.

7. The apparatus as recited in claim 1, wherein said mobile light source is substantially a cube with rounded corners.

8. The apparatus as recited in claim 7, wherein said cube is about 43 mm in each dimension.

9. The apparatus as recited in claim 1, wherein said array of lights comprises nine light emitting diodes (LEDs).

10. The apparatus as recited in claim 1, wherein said apparatus is substantially water proof up to one hundred feet deep.

11. The apparatus as recited in claim 1, wherein said PCB has a thickness that substantially resists warping from heat generated by said array of lights and said at least one battery.

12. The apparatus as recited in claim 1, further comprising a plurality of buttons situated on said second outer casing connected to said PCB for controlling said array of lights.

13. The apparatus as recited in claim 1, wherein said at least one battery is an 800 mAh battery and said apparatus further comprises a second 800 mAh battery.

14. The apparatus as recited in claim 1, further comprising a gasket situated between said first outer casing and said second outer casing to provide a substantially water tight seal.

15. The apparatus as recited in claim 1, further comprising an optical infrared sensor situated substantially alongside said array of lights and visible through said lens and connected to said PCB, wherein said optical infrared sensor is for detecting a flash of light from an external light source, and wherein said PCB will trigger said array of lights to emit light in response to said detecting said flash of light.

16. The apparatus as recited in claim 1, wherein said apparatus substantially forms a cube and each side of said cube is no greater than two inches.

17. The apparatus as recited in claim 1, wherein said heat shield is composed of an aluminum alloy.

18. The apparatus as recited in claim 1, wherein said heat shield further comprises openings to allow wired connections between said PCB and said array of lights.

19. The apparatus as recited in claim 1, wherein said PCB further comprises an antenna for sending and receiving signals with an external device.

20. The apparatus as recited in claim 1, wherein said array of lights is configured to output about 1500 lumens in at least one of said modes.

21. The apparatus as recited in claim 1, wherein said plurality of user-selectable modes further comprises a single flash of light mode.

22. The apparatus as recited in claim 1, wherein said PCB further comprises a wireless receiver which uses a wireless protocol for communications to allow an external device to control the mobile light source.

23. The apparatus as recited in claim 1, wherein said heat shield is about 1.6 mm thick.

24. The apparatus as recited in claim 1, wherein said lens is about 7 mm thick.

25. The apparatus as recited in claim 1, wherein said lens has a diameter of about 28 mm.

26. The apparatus as recited in claim 1, wherein said lens directs light from said light array in a funnel shape with about a 57 degree angle.

27. The apparatus as recited in claim 1, wherein said at least one battery is rechargeable.

28. The apparatus as recited in claim 1, wherein said second outer casing is composed of a metal alloy.

29. The apparatus as recited in claim 1, wherein said array of lights are surrounded by said first outer casing.

30. An apparatus for a mobile light source, comprising:

a first outer casing housing an array of lights, wherein said array of lights are located on a surface of a substrate, and where said first outer casing comprises grooves in at least one outer surface to enhance cooling properties of said first outer casing or said first outer casing is composed of an aluminum alloy such that said aluminum alloy provides cooling properties to dissipate heat;

a lens situated in said first outer casing to allow light emitting from said array of lights to pass through said first outer casing;

a second outer casing coupled with said first outer casing to create an enclosure;

at least one battery situated in a second compartment of said enclosure housed by said second outer casing to power said array of lights;

a printed circuit board (PCB) with circuitry for controlling said array of lights, and wherein a surface said PCB is substantially parallel to said surface of said substrate, and wherein said circuitry for controlling said array of lights is configured to provide a plurality of user-selectable modes comprising: a constant emission of light mode, with user-selectable brightness, and a strobing light mode; and a heat shield composed of a metal alloy and said heat shield is located in said first outer casing to create a thermal barrier between said array of lights and said PCB and to transfer heat generated by said array of lights to said first outer casing;

wherein said at least one battery is positioned between said heat shield and said PCB.

\* \* \* \* \*